United States Patent

Gillooly

[15] 3,639,253

[45] Feb. 1, 1972

[54] PREPARATION OF HALOPHOSPHATE PHOSPHORS USING ANTIMONY-DOPED CALCIUM PYROPHOSPHATE

[72] Inventor: George R. Gillooly, Cleveland Heights, Ohio

[73] Assignee: General Electric Company

[22] Filed: Jan. 28, 1970

[21] Appl. No.: 6,584

[52] U.S. Cl. ................................................... 252/301.4 P
[51] Int. Cl. ............................................................ C09k 1/36
[58] Field of Search ............................. 252/301.4 P, 301.6 P

[56] References Cited

UNITED STATES PATENTS 2,755,254   7/1956   Butler .............................. 252/301.4 P
3,468,812   9/1969   Wanmaker et al. ............... 252/301.4 P

FOREIGN PATENTS OR APPLICATIONS 578,272   6/1946   Great Britain .................... 252/301.4 P Primary Examiner—Robert D. Edmonds
Attorney—Richard H. Burgess, Henry P. Truesdell, Frank L. Neuhauser, Oscar B. Waddell and Joseph B. Forman

[57] ABSTRACT

Antimony-doped calcium pyrophosphate is used as the antimony-supplying ingredient in the manufacture of calcium halophosphate phosphors activated with antimony or antimony plus manganese. The extreme fineness and high reactivity of the antimony-supplying materials and their low volatility at lower temperatures are significant advantages in the manufacture of the phosphors.

9 Claims, No Drawings

PREPARATION OF HALOPHOSPHATE PHOSPHORS USING ANTIMONY-DOPED CALCIUM PYROPHOSPHATE

BACKGROUND OF THE INVENTION

The present invention relates to a process for the manufacture of calcium halophosphate phosphors. More particularly, it relates to the use of particular intermediates or ingredients in the production of such phosphors.

In the preparation of calcium halophosphate phosphors activated with antimony and optionally also with manganese, it is known that the use of tetravalent or pentavalent rather than trivalent antimony compounds will diminish volatility and losses of antimony and chlorine during manufacture of the phosphor. However, improvements are constantly being sought in processes for the manufacture of such phosphors.

SUMMARY OF THE INVENTION

It is an object of the present invention to provide a process for the production of calcium halophosphate phosphors in which the losses of antimony and chlorine will be much less than occurred with prior art processes. Another object is to increase the reactivity and decrease the particle size of the antimony constituent of the phosphor intermediate ingredients.

Briefly stated, the present invention provides a process of preparing an antimony-activated calcium halophosphate phosphor, said process comprising: mixing together in powdered form antimony-doped calcium pyrophosphate containing antimony in an activating amount, with ingredients reactable to form said phosphor and firing said mixture. Manganese can also be used as an optional additional activator or coactivator to obtain different colors.

The antimony-doped calcium pyrophosphate intermediate of the invention is preferably prepared by reacting $CaHPO_4$ and $Sb_2O_3$, and the resulting $Ca_2P_2O_7 \cdot xCa(SbO_3)_2$ is used along with, for example, $CaCO_3$ and $CaF_2$ to produce antimony-doped phosphors having a bluish color. Cool-white and warm-white phosphors can be produced as known in the art by also using $CaCl_2$ and $MnCO_3$ as additional ingredients. Preferred firing conditions, as known in the art, are temperatures in the range of 1,050° to 1,200° C. for times sufficient to form efficient phosphors such as 2 to 3 hours for large samples. Shorter times could be used for smaller samples.

The invention also includes the $Ca_2P_2O_7 \cdot xCa(SbO_3)_2$ and its method of preparation described below.

DESCRIPTION OF THE PREFERRED EMBODIMENTS

The following amounts of antimonous oxide and dicalcium phosphate are blended together to produce an intermediate material suitable for preparation of standard halophosphate phosphors. MW means effective molecular weight.

|         | Moles  | MW    | Grams |
|---------|--------|-------|-------|
| $CaHPO_4$ | 6.000  | 138.5 | 831.0 |
| $Sb_2O_3$ | 0.055  | 291   | 16.0  |

The dicalcium phosphate preferably includes an excess of calcium in oxide form to facilitate formation of the antimony-doped calcium pyrophosphate, $Ca_2P_2O_7 \cdot xCa(SbO_3)_2$, in accordance with the following formula:

$2CaHPO_4(0.02CaO) + 0.04Sb_2O_3 \xrightarrow{(O_2)} Ca_2P_2O_7 \cdot 0.04Ca(SbO_3)_2 + H_2O \uparrow$

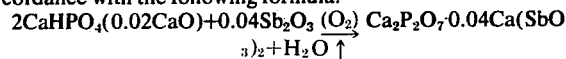

The value of $x$ indicated the antimony content can preferably range from 0.005 to 0.050 depending on the phosphor formulation and characteristics desired for the resulting phosphor for conventional phosphor production. Of course, other values of $x$ could be appropriate, for example, when different ingredients or proportions are used to prepare the phosphor.

The amount of antimony may be varied to obtain the desired final antimony content as determined by variations of the furnace geometry and firing schedule in a manner familiar to the art. A typical example would be to fire about 3 kilograms about 3 hours in open silica dishes with sufficient oxygen present to oxidize the antimony and form a calcium antimonate at about 950° C., preferably the meta-antimonate. After such a firing the intermediate is not sintered but remains fluid and can be used after minimal crushing and screening.

EXAMPLES OF FORMULAS FOR USING Sb-DOPED PYROPHOSPHATE

The following ingredients may be blended together by techniques familiar to the art:

I. BLUE HALOPHOSPHOR

| Intermediates | Moles | MW | Grams |
|---|---|---|---|
| $Ca_2P_2O_7 \cdot xCa(SbO_3)_2$ | 3.00 | 258 | 774 |
| $CaCO_3$ | 2.83 | 100 | 283 |
| $CaF_2$ | 0.95 | 78 | 74 |

When warmer color is desired, manganese and chloride are added, according to the art, and calcium and fluoride are reduced, as for example:

II. COOL-WHITE HALOPHOSPHOR

| Intermediates | Moles | MW | Grams |
|---|---|---|---|
| $Ca_2P_2O_7 \cdot xCa(SbO_3)_2$ | 3.00 | 258 | 774 |
| $CaCO_3$ | 2.63 | 100 | 263 |
| $CaF_2$ | 0.89 | 78 | 69 |
| $CaCl_2$ | 0.10 | 111 | 11 |
| $MnCO_3$ | 0.18 | 125 | 22.5 |

Or, for even warmer color, even greater substitution of manganese is used:

III. WARM-WHITE HALOPHOSPHOR

| Intermediates | Moles | MW | Grams |
|---|---|---|---|
| $Ca_2P_2O_7 \cdot xCa(SbO_3)_2$ | 3.00 | 258 | 774 |
| $CaCO_3$ | 2.47 | 100 | 73 |
| $CaF_2$ | 0.89 | 78 | 69 |
| $CaCl_2$ | 0.10 | 111 | 11 |
| $MnCO_3$ | 0.34 | 125 | 42.5 |

In all the above cases, it may be seen that the effective molecular weight of antimony-doped pyrophosphate is slightly increased over the theoretical weight of calcium pyrophosphate due to the increased average weight caused by the addition of antimony.

The batch materials described above may be heated together in a manner familiar to the art and for varying times and temperatures as determined by techniques familiar to the art.

EXAMPLE OF FIRING PROCEDURE

About 2 to 3 kilograms may be heated to 1,100° to 1,200° C., preferably about 1,150° C. for Example II, for 2 to 3 hours in silica trays, preferably covered. The thus-fired material may be suitable for use in lamps. However, better results can be obtained if this material is crushed, blended, and fired a second time, preferably in a covered dish and in an inert atmosphere, such as nitrogen. For Example I, the preferred temperature may be somewhat higher than 1,150° C. for the first firing, and for Example III, the preferred temperature may be somewhat less than 1,150° C. for the first firing. The temperature of the second firing may be even lower if an inert atmosphere is used, preferably about 1,050° C. for all three examples.

For example, calcium meta-antimonate prepared according to the prior art and reduced in size by extremely rigorous ball-milling may attain particle sizes in the range of 1–3 microns ($\mu$), whereas the calcium meta-antimonate from the antimony-doped calcium pyrophosphate is prepared in extremely fine particles which lie almost entirely in a range below $1\mu$. The calcium pyrophosphate particles themselves preferably have sizes from $5\mu$ to $25\mu$. The extreme fineness of the calcium meta-antimonate is well illustrated by the increase of surface area from 6 square meters per gram (m.$^2$/g.) for the prior art to about 30 m.$^2$/g. for the present invention. Such an increase in surface area due to the increased fineness of the particles presents a proportionate increase in the opportunity for chemical reaction. A second advantage derived from the use of smaller particles is the greater number of particles required to obtain a given weight of the ingredient, which greater number can be distributed more uniformly throughout the batch. Moreover, when the fine particles are prepared in conjunction with the calcium pyrophosphate which is the major ingredient of the phosphor batch, more uniform dispersion is assured.

Calcium meta-antimonate particles used according to the prior art are relatively very coarse in grain and not very reactive. They distribute poorly in the batch. By comparison, materials of the invention are extremely fine powders.

What I claim as new and desire to secure by Letters Patent of the United States is:

1. The process of preparing an antimony-activated calcium halophosphate phosphor, said process comprising: mixing together in powdered form antimony-doped calcium pyrophosphate containing antimony in an activating amount, with ingredients reactable to form said phosphor and firing said mixture.

2. The process of claim 1 in which said antimony-doped calcium pyrophosphate has been prepared by reacting together at elevated temperature $CaHPO_4$ and $Sb_2O_3$ in selected quantities.

3. The process of claim 1 in which the phosphor is also activated with manganese.

4. The process of claim 1 in which the ingredients used to prepare the phosphor are $Ca_2P_2O_7$:Sb, $CaCO_3$, and $CaF_2$.

5. The process of claim 4 in which said ingredients are reacted together at a temperature in the range of 1,050° to 1,200° C. for sufficient time to produce an efficient phosphor.

6. The process according to claim 3 in which the ingredients are $Ca_2P_2O_7$:Sb, $CaCO_3$, $CaF_2$, $CaCl_2$, and $MnCO_3$.

7. The process according to claim 6 in which said ingredients are reacted together at a temperature in the range of 1,050° to 1,200° C. for sufficient time to produce an efficient phosphor.

8. An intermediate material for use in the process of claim 1 consisting essentially of antimony-doped calcium pyrophosphate in the form of small particles of $Ca_2P_2O_7$ having an average size in the range of $5\mu$ to $25\mu$ and in which the antimony, at least in part, is in the form of submicron particles of calcium meta-antimonate located on the surfaces of the particles of calcium pyrophosphate.

9. The method of preparing the intermediate material of claim 8 wherein $CaHPO_4$ is reacted with $Sb_2O_3$, and wherein said $CaHPO_4$ contains an excess of CaO in an amount at least great enough to react with said $Sb_2O_3$ to form $Ca(SbO_3)_2$.

* * * * *